United States Patent
Rahardjo et al.

(10) Patent No.: US 10,852,352 B2
(45) Date of Patent: Dec. 1, 2020

(54) SYSTEM AND METHOD TO SECURE FPGA CARD DEBUG PORTS

(71) Applicant: Dell Products, L.P., Round Rock, TX (US)

(72) Inventors: Johan Rahardjo, Austin, TX (US); Pavan Kumar Gavvala, Anantapur (IN)

(73) Assignee: Dell Products, L.P., Round Rock, TX (US)

( * ) Notice: Subject to any disclaimer, the term of this patent is extended or adjusted under 35 U.S.C. 154(b) by 295 days.

(21) Appl. No.: 16/171,215

(22) Filed: Oct. 25, 2018

(65) Prior Publication Data
US 2020/0132761 A1    Apr. 30, 2020

(51) Int. Cl.
| | |
|---|---|
| *G06F 21/76* | (2013.01) |
| *G01R 31/317* | (2006.01) |
| *G06F 21/30* | (2013.01) |
| *G01R 31/3177* | (2006.01) |

(52) U.S. Cl.
CPC ... *G01R 31/31719* (2013.01); *G01R 31/3177* (2013.01); *G06F 21/305* (2013.01); *G06F 21/76* (2013.01)

(58) Field of Classification Search
CPC .. G06F 11/2294; G06F 11/261; G06F 21/305; G06F 21/76; G01R 31/31719; G01R 31/3177
See application file for complete search history.

(56) References Cited

U.S. PATENT DOCUMENTS

| | | | | |
|---|---|---|---|---|
| 2007/0016827 | A1* | 1/2007 | Lopez, Jr. | G06F 11/2294 714/31 |
| 2009/0024779 | A1* | 1/2009 | Chan | G06F 1/187 710/304 |
| 2017/0048132 | A1* | 2/2017 | Walker | H04L 41/12 |
| 2017/0308725 | A1* | 10/2017 | Sardaryan | G06F 1/08 |
| 2019/0068708 | A1* | 2/2019 | Rachabathuni | G06F 3/0622 |
| 2019/0361073 | A1* | 11/2019 | Trantham | G06F 11/00 |

* cited by examiner

*Primary Examiner* — Joseph P Hirl
*Assistant Examiner* — Sayed Aresh Beheshti Shirazi
(74) *Attorney, Agent, or Firm* — Fogarty LLP

(57) ABSTRACT

Embodiments are described for securing access to a debug port of an FPGA (Field Programmable Gate Array) card installed within an IHS (Information Handling System). A remote access controller determines the status of the FPGA card debug port via a query to a management controller of the FPGA card. The remote access controller generates a passcode for the debug port and disables the debug port via a message to the management controller. The management controller detects a request, that includes a requestor password, for access to the debug port. The remote access controller authorizes the requestor's access to the debug port if the requestor password matches the generated passcode. The remote access controller disables the debug port upon each power cycle of the FPGA card or upon detecting removal of a device from the debug port.

17 Claims, 3 Drawing Sheets

US 10,852,352 B2

SYSTEM AND METHOD TO SECURE FPGA CARD DEBUG PORTS

FIELD

The present disclosure generally relates to Information Handling Systems (IHSs), and, more particularly, to remote monitoring and management of components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, the most common technique for customizing the operations of an IHS has been through software programs that are executed by the IHS. More recently, FPGA (Field Programmable Gate Array) cards are used to provide customized IHS functionality at hardware speeds, while doing so at an affordable price. Some FPGA cards may include physical ports by which debugging and diagnostic tools may be coupled to the FPGA in order to provide FPGA developers with a mechanism for accessing the FPGA directly.

SUMMARY

In various embodiments, a method is provided for securing access to an FPGA (Field Programmable Gate Array) card debug port by a remote access controller. The method includes: determining a status of the FPGA card debug port via a query to a management controller of the FPGA card; generating a passcode for the debug port; disabling the debug port via a message to the management controller; detecting a request for access to the debug port by a requestor, wherein the request includes a requestor password; providing the requestor access to the debug port, if the requestor password matches the generated passcode; and disabling the debug port upon the next power cycle of the FPGA card.

In additional method embodiments, the management controller communicates with a service processor of the remote access controller via a sideband management bus. In additional method embodiments, the service processor limits access to the generated passcode to authenticated administrators with access to the remote access controller. In additional method embodiments, the passcode is generated by hashing a serial number of the FPGA card concatenated with a service tag of the IHS (Information Handling System) in which the FPGA card is installed. In additional method embodiments, the passcode is generated based on inputs provided via a user interface of the remote access controller. In additional method embodiments, upon enabling of the debug port, the debug port is disabled upon detecting de-coupling of a device from the debug port. In additional method embodiments, the management controller detects the de-coupling of the device from the debug port and reports the disabling of the debug port to the remote access controller.

In various embodiments, a system is provided for securing access to a debug port of an FPGA (Field Programmable Gate Array) card installed in an Information Handling System (IHS). The system includes: a remote access controller configured to monitor operations of the IHS, the remote access controller configured to: issue a query to a management controller of the FPGA card to determine a status of the FPGA card debug port; generate a passcode for the debug port; disable the debug port via a message to the management controller; receive a request for access to the debug port, wherein the request includes a requestor password; authorize access to the debug port by the requestor, if the requestor password matches the generated passcode; and disable the debug port upon the next power cycle of the FPGA card; and the management controller configured to: determine the status of the debug port in response to the query from the remote access controller; detect the coupling of a device to the debug port; receive a request from the device for the requestor to access the debug port, wherein the request includes the requestor password; and enable the debug port upon the authorization of the remote access controller.

In additional system embodiments, the management controller communicates with a service processor of the remote access controller via a sideband management bus. In additional system embodiments, the service processor limits access to the generated passcode to authenticated administrators with access to the remote access controller. In additional system embodiments, the passcode is generated by hashing a serial number of the FPGA card with a service tag of the IHS (Information Handling System) in which the FPGA card is installed. In additional system embodiments, the passcode is generated based on inputs provided via a user interface of the remote access controller. In additional system embodiments, upon enabling of the debug port, the debug port is disabled upon detecting de-coupling of a device from the debug port. In additional system embodiments, the management controller detects the de-coupling of the device from the debug port and reports the disabling of the debug port to the remote access controller.

In various additional embodiments, a remote access controller is configured for securing access to an FPGA (Field Programmable Gate Array) card debug port. The remote access controller is configured to: determine a status of the FPGA card debug port via a query to a management controller of the FPGA card; generate a passcode for the debug port; disable the debug port via a message to the management controller; detect a request for access to the debug port by a requestor, wherein the request includes a requestor password; provide the requestor access to the debug port if the requestor password matches the generated passcode; and disable the debug port upon the next power cycle of the FPGA card.

In additional remote access controller embodiments, the management controller communicates with a service processor of the remote access controller via a sideband management bus. In additional remote access controller embodiments, the service processor limits access to the generated passcode to authenticated administrators with access to the remote access controller. In additional remote access controller embodiments, the passcode is generated by hashing a serial number of the FPGA card with a service tag of the IHS (Information Handling System) in which the FPGA card is installed. In additional remote access controller embodiments, the passcode is generated based on inputs provided via a user interface of the remote access controller. In additional remote access controller embodiments, upon enabling of the debug port, the debug port is disabled upon detecting de-coupling of a device from the debug port.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
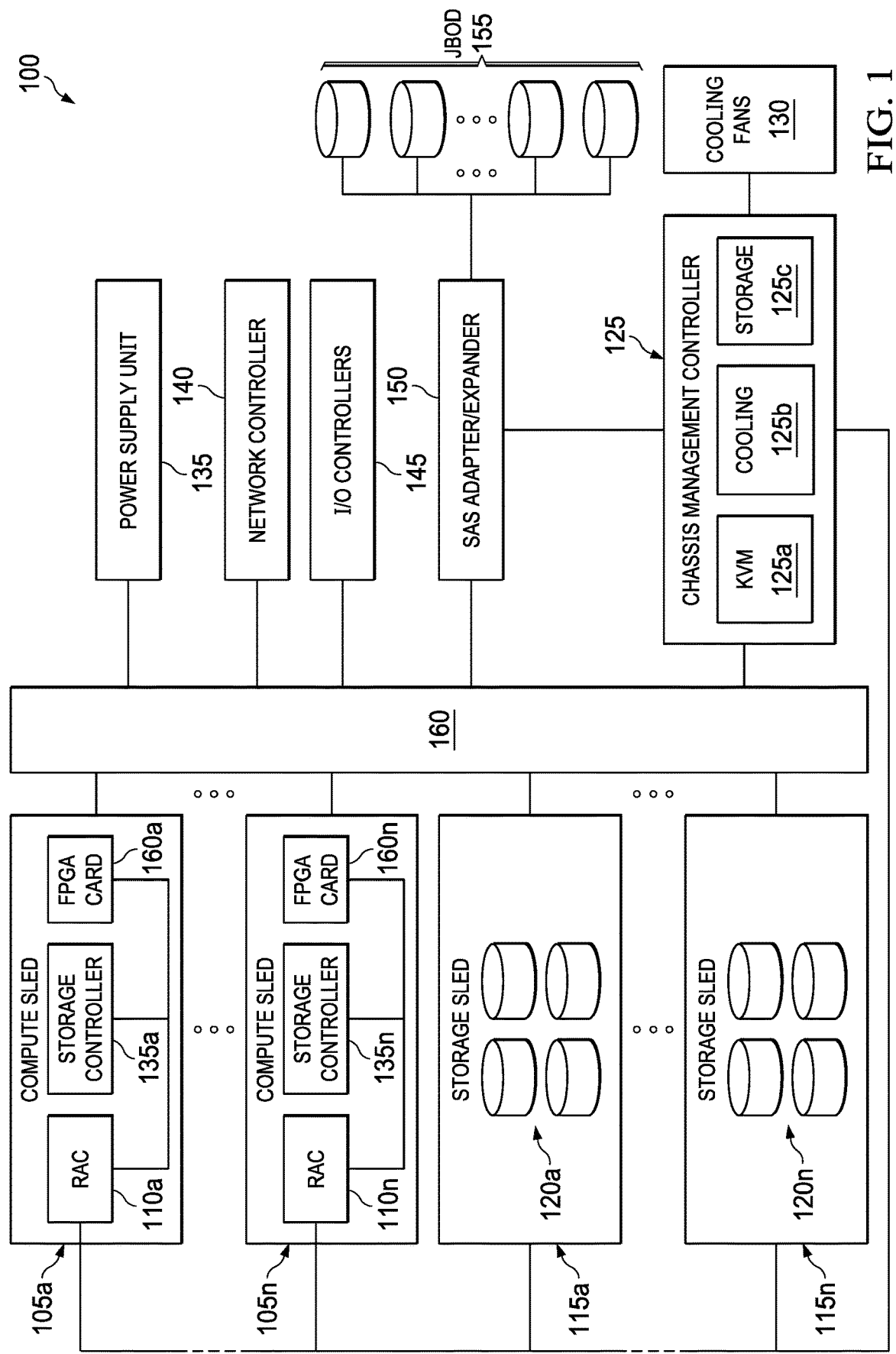
FIG. 1 is a diagram illustrating certain components of a chassis, according to some embodiments, for securing access to FPGA card debug ports.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
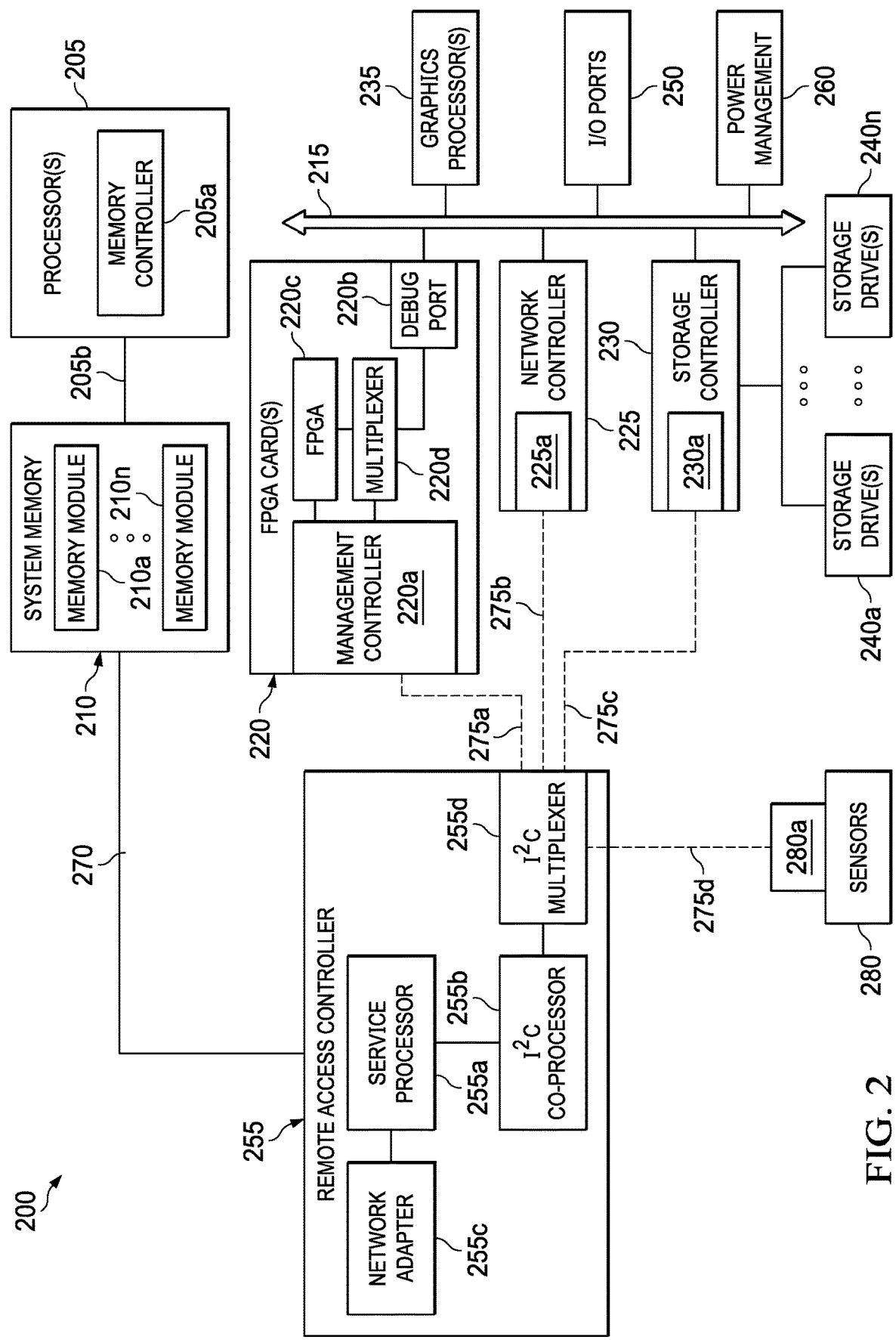
FIG. 2 is a diagram illustrating certain components of an IHS configured as a component of chassis, according to some embodiments, for securing access to FPGA card debug ports.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations.

The storage sleds 115*a-n* may be utilized in various storage configurations by the compute sleds 105*a-n* that are coupled to chassis 100.

Each of the compute sleds 105*a-n* includes a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

As illustrated, each of the compute sleds 105*a-n* also includes an FPGA card 160*a-n* that may be configured to customize the operations of compute sled 105*a-n*. As described in additional detail with regard to FIGS. 2 and 3, FPGA cards 160*a-n* may include a physical debug port by which diagnostic instruments may be coupled directly to the FPGA card 160*a-n*. In various embodiments remote access controllers 110*a-n* may be configured to disable the debug ports of the respective FPGA cards 160*a-n* until a user seeking access to a debug port is properly authenticated.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105*a-n*, that is configured to share infrastructure resources provided by a chassis 100.

The IHS 200 of FIG. 2 may be a compute sled, such as compute sleds 105*a-n* of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

As illustrated, an FPGA card 220 may include an FPGA integrated circuit 220c that may be reprogrammed in order to modify the operations of the internal logical circuits of the FPGA 220c, thus modifying the operations performed by the FPGA card 220. Such reprogramming of the FPGA 220c may be supported by an interface manager of the FPGA card 220 that supports one or more external interfaces for accessing aspects of the FPGA card, such as memory, thermal and power monitoring, error reporting and offloading processing functions to the FPGA circuit 220c. The highly customized nature of FPGAs can make such components difficult to debug.

Accordingly, certain FPGA cards include a debug port 220b by which the FPGA 220c may be accessed directly and coupled to diagnostic probes and other tools. The debug port 220b provides an important tool for FPGA card 220 developers to identify and repairs errors in the operation of the FPGA 220c. However, uncontrolled access to the debug port 220b provides an opportunity for malicious actors to determine and/or modify the operation of the FPGA 220c. In certain embodiments, the debug port 220b is accessed by operation of a multiplexer 220d of the FPGA card 220. The multiplexer 220d controls to the bus by which the debug port 220b may be coupled to the FPGA card 220. As described in additional detail with regard to FIG. 3, the operation of the multiplexer 220d for establishing a connection with the debug port 220b may be disabled by the operation of the remote access controller 255, thus limiting debug port 220b access to individuals authenticated according to a policy enforced by the remote access controller 255.

The FPGA card 220 may also include a management controller 220a that may support interoperation with the remote access controller 255 via a sideband device management bus 275a. As described in additional detail with regard to the below embodiments, the management controller 220a may be configured to interoperate with the remote access controller 255 in securing access to the FPGA card debug port 220b in order to limit debug port 220b access to authenticated users.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a*-*d* that may be individually established with each of the respective managed devices 220, 225, 230, 280 through the operation of an I2C multiplexer 255*d* of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275*a*-*d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or microcontroller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a*-*d* is illustrated as single line in FIG. 2. However, each I2C bus 275*a*-*d* may be comprised of a clock line and data line that couple the remote access controller 255 to I2C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband I2C buses 275*a*-*d* selected through the operation of an I2C multiplexer 255*d*. Via switching operations by the I2C multiplexer 255*d*, a sideband bus connection 275*a*-*d* may be established by a direct coupling between the I2C co-processor 255*b* and an individual managed device 220, 225, 230, 280.

In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280. In certain embodiments, the endpoint I2C controller 280*a* of the FPGA card 220 may correspond to the management controller 220*a* described above.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
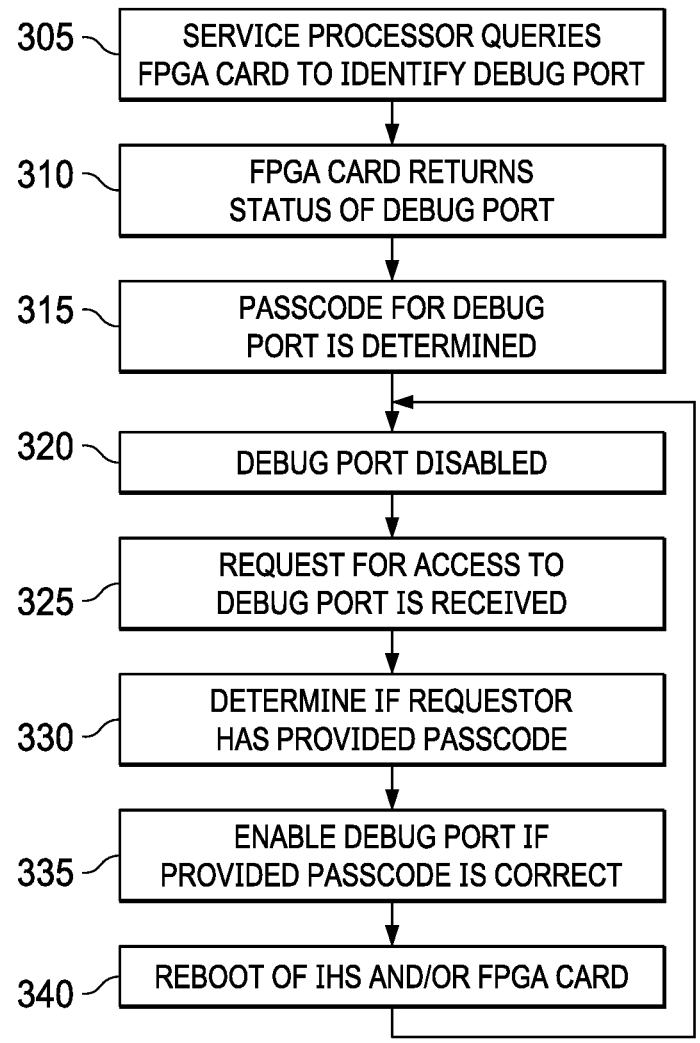
FIG. 3 is a flowchart describing certain steps of a method, according to some embodiments, for securing access to FPGA card debug ports.

FIG. 3 is a flowchart describing certain steps of a method, according to some embodiments, for securing access to debug ports on an FPGA card that is coupled to a remote access controller via a sideband management bus. As described with regard to FIG. 2, an FPGA card may include a debug port by which diagnostic and debugging tools may be directly coupled to an FPGA. The illustrated method begins at block 305 with the service processor of the remote access controller issuing a query to a management controller of the FPGA card via a sideband management bus in order to determine whether the FPGA card includes a debug port. In certain embodiments, the query may be a VDM (Vendor Defined Message) issued via a PLDM bus messaging protocol.

At block 310, the management controller of the FPGA card may return a message to the service processor indicating whether the FPGA card includes a debug port. The message from the management controller may also indicate a status of the debug port, such as whether the debug port is currently in use, the debug port is locked, or the debug port is unlocked. If a debug port is detected, at block 315, the service processor determines a passcode for controlling access to the debug port. In certain embodiments, the service processor may generate a passcode based on a hash of the serial number associated with the FPGA card concatenated with a service tag of the IHS in which the FPGA card and remote access controller are installed, such as described with regard to FIG. 2. The service processor may utilize various other methodologies for generating a passcode for securing a debug port.

As described, an FPGA includes programmable logic by which specialized data processing functions may be implemented at hardware speeds. In certain embodiments, a function may be implemented in the programmable logic of the FPGA for authenticating the request for access to the debug port. In certain instances, the configuration of the programmable logic of the FPG may be represented as a schema that may be encoded in a data file. In such embodiments, the passcode generated by the service processor may be based on a hash that further concatenates the schema data file of the FPGA. The generated passcode is thus further restricted to the current schema by which the FPGA programmable logic has been configured. In such embodiments, any changes to the FPGA schema results in disabling of the debug port passcode.

As described, an IHS such as compute sled 200 of FIG. 2 may support multiple FPGA cards 220 concurrently. In such scenarios, the remote access controller secures the debug ports on each of the individual FPGA cards. In certain embodiments, the security for the individual debug ports may be enforced separately by the remote access controller. In other embodiments, the remote access controller may support debug port requests that request access to the debug port by which a diagnostic tool has been coupled, and in addition request access to debug port functions on another FPGA card supported by the remote access controller. In such instances, the requestor may include the passcode for the coupled debug port and the passcode associated with any other debug ports supported by the remote access controller. Upon authenticating such passcodes, the remote access controller may facilitate access to debug port functions on all FPGA cards that are supported by the remote access controller.

If the debug port is not reported as being disabled, at block 320, the service processor may issue a command to the management controller of the FPGA card to disable the debug port. In certain embodiments, the management controller may disable the debug port by disabling the hardware pathway by which the debug port is accessed. For instance, in certain FPGA cards, the debug port may be a USB port that is accessed via the operation of a USB multiplexer. In certain embodiments, the debug port may be disabled by the management controller by disabling the ability of the USB multiplexer to switch to a position that allows a USB bus connection to be established with the debug port. By disabling the debug port in the manner, the debug port cannot be enabled via the operation of malicious actors without compromising the remote access controller in order to generate the instructions necessary to re-enable the USB multiplexer. In such embodiments, the debug port of the FPGA card cannot be compromised by simply installing the FPGA card in another IHS, since re-enabling the debug port requires generating the instructions from the same remote access controller that disabled the signaling pathway of the debug port.

With the debug port disabled, at block 325, the management controller of the FPGA card detects the coupling of a device to the debug port. The management controller may then interrogate the device coupled to the debug port for a passcode. The debug port may remain disabled for all other functions besides the passcode interrogation of the management controller. Once a passcode has been provided, the management controller transmits the provided passcode to the service processor via the sideband management bus.

At block 330, the service processor determines whether requesting device has provided a passcode matching the passcode generated for the debug port by the service processor at block 315. If the provided passcode matches the passcode maintained by the service processor, at block 335, access to the debug port may be enabled via a message from the service processor to the management controller. In certain embodiments, the debug port may be enabled in write mode or the debug port may be limited to read mode. In such embodiments, the mode in which the debug port is enabled may be based on the passcode that is provided by the requestor seeking access to the debug port. In this manner, certain users may be limited to read-only access to the debug port, thus allowing logs and other diagnostic information to be accessed. However, read mode users may be prevented from modifying any aspects of the operation of the FPGA card.

Enabling a debug port in write mode may allow the debug port to be used in various types of modification to the FPGA card, including modifying the programmable logic of the FPGA and modifying the firmware used by the FPGA card. Accordingly, in certain embodiments, the service processor may be configured to generate a backup copy of the FPGA card firmware and/or the current configuration of the programmable logic of the FPGA prior to enabling the debug port in write mode.

With the debug port enabled, the requestor may access the FPGA card according to the privileges granted by the service processor. In certain embodiments, the debug port may be disabled upon detecting a decoupling of a device from the debug port. In other embodiments, the debug port may remain enabled until the IHS and/or the FPGA card is rebooted, at step 340, at which time the debug port is again disabled. In certain embodiments, a new passcode for the debug port may be generated upon each reboot of the IHS and/or the FPGA card.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for securing access to an FPGA (Field Programmable Gate Array) card debug port by a remote access controller, the method comprising:
   determining a status of the FPGA card debug port via a query to a management controller of the FPGA card;
   detecting a coupling of a device to the debug port;
   generating a passcode for the debug port, wherein the passcode is generated by hashing a serial number of the FPGA card concatenated with a service tag of the IHS (Information Handling System) in which the FPGA card is installed;
   disabling the debug port via a message to the management controller;
   detecting a request for access to the debug port by a requestor, wherein the request includes a requestor password;
   providing the requestor access to the debug port, if the requestor password matches the generated passcode; and
   disabling the debug port upon the next power cycle of the FPGA card.

2. The method of claim 1, wherein the management controller communicates with a service processor of the remote access controller via a sideband management bus.

3. The method of claim 2, wherein the service processor limits access to the generated passcode to authenticated administrators with access to the remote access controller.

4. The method of claim 1, wherein the passcode is generated based on inputs provided via a user interface of the remote access controller.

5. The method of claim 1, wherein, upon enabling of the debug port, the debug port is disabled upon detecting de-coupling of a device from the debug port.

6. The method of claim 5, wherein the management controller detects the de-coupling of the device from the debug port and reports the disabling of the debug port to the remote access controller.

7. A system for securing access to a debug port of an FPGA (Field Programmable Gate Array) card installed in an Information Handling System (IHS), the system comprising:
   a remote access controller configured to monitor operations of the IHS, the remote access controller configured to:
      issue a query to a management controller of the FPGA card to determine a status of the FPGA card debug port;
      generate a passcode for the debug port, wherein the passcode is generated by hashing a serial number of the FPGA card concatenated with a service tag of the IHS;
      disable the debug port via a message to the management controller;
      receive a request for access to the debug port, wherein the request includes a requestor password;
      authorize access to the debug port by the requestor, if the requestor password matches the generated passcode; and
      disable the debug port upon the next power cycle of the FPGA card; and
   the management controller configured to:
      determine the status of the debug port in response to the query from the remote access controller;
      detect the coupling of a device to the debug port;
      receive a request from the device for the requestor to access the debug port, wherein the request includes the requestor password; and
      enable the debug port upon the authorization of the remote access controller.

8. The system of claim 7, wherein the management controller communicates with a service processor of the remote access controller via a sideband management bus.

9. The system of claim 8, wherein the service processor limits access to the generated passcode to authenticated administrators with access to the remote access controller.

10. The system of claim 7, wherein the passcode is generated based on inputs provided via a user interface of the remote access controller.

11. The system of claim 7, wherein, upon enabling of the debug port, the debug port is disabled upon detecting de-coupling of a device from the debug port.

12. The system of claim 5, wherein the management controller detects the de-coupling of the device from the debug port and reports the disabling of the debug port to the remote access controller.

13. A remote access controller configured for securing access to an FPGA (Field Programmable Gate Array) card debug port, the remote access controller configured to:
   determine a status of the FPGA card debug port via a query to a management controller of the FPGA card;
   detect a coupling of a device to the debug port;
   generate a passcode for the debug port, wherein the passcode is generated by hashing a serial number of the FPGA card concatenated with a service tag of the IHS (Information Handling System) in which the FPGA card is installed;
   disable the debug port via a message to the management controller;
   detect a request for access to the debug port by a requestor, wherein the request includes a requestor password;
   provide the requestor access to the debug port if the requestor password matches the generated passcode; and
   disable the debug port upon the next power cycle of the FPGA card.

14. The remote access controller of claim 13, wherein the management controller communicates with a service processor of the remote access controller via a sideband management bus.

15. The remote access controller of claim 14, wherein the service processor limits access to the generated passcode to authenticated administrators with access to the remote access controller.

16. The remote access controller of claim 13, wherein the passcode is generated based on inputs provided via a user interface of the remote access controller.

17. The remote access controller of claim 13, wherein, upon enabling of the debug port, the debug port is disabled upon detecting de-coupling of a device from the debug port.

* * * * *